United States Patent
Buckingham et al.

(10) Patent No.: US 7,326,435 B2
(45) Date of Patent: Feb. 5, 2008

(54) METHOD OF ILLUMINATING A ROTARY BLADE BY APPLICATION OF A PHOTOLUMINESCENT PAINT

(75) Inventors: Thomas Martin Buckingham, Severna Park, MD (US); Wallace Michael Elger, Annapolis, MD (US)

(73) Assignee: Defense Holdings, Inc., Arlington, VA (US)

( * ) Notice: Subject to any disclaimer, the term of this patent is extended or adjusted under 35 U.S.C. 154(b) by 560 days.

(21) Appl. No.: 10/623,186

(22) Filed: Jul. 21, 2003

(65) Prior Publication Data

US 2005/0052880 A1   Mar. 10, 2005

Related U.S. Application Data

(60) Provisional application No. 60/397,017, filed on Jul. 22, 2002.

(51) Int. Cl.
*B05D 5/00* (2006.01)
*B05D 1/00* (2006.01)

(52) U.S. Cl. ..................... 427/64; 427/407.1
(58) Field of Classification Search .................. 427/64, 427/71, 72, 407.1
See application file for complete search history.

(56) References Cited

U.S. PATENT DOCUMENTS

| | | | |
|---|---|---|---|
| 4,066,890 A | 1/1978 | Hamilton et al. | |
| 4,916,581 A | 4/1990 | Authier | |
| 5,186,046 A * | 2/1993 | Gouterman et al. | .......... 73/147 |
| 5,415,911 A | 5/1995 | Zampa et al. | |
| 5,416,672 A | 5/1995 | Authier | |
| 5,474,482 A | 12/1995 | Davidson | |
| 5,793,164 A | 8/1998 | Authier | |
| 5,854,682 A | 12/1998 | Gu | |
| 6,048,172 A | 4/2000 | Pniel | |
| 6,082,868 A | 7/2000 | Carpenter | |
| 6,367,942 B1 | 4/2002 | Bauer | |
| 2002/0110180 A1* | 8/2002 | Barney et al. | .............. 374/161 |

OTHER PUBLICATIONS

Burns, S., and Sullivan, J., "The Use of Pressure Sensitive Paint on Rotating Machinery," CH34827-95, IEEE 16th International Congress on Instrumentation in Aerospace Simulation Faciles (ICIASF), Wright-Patterson AFB, OH, 1995, pp. 32.1-32.14.*

*Hazards of Rotating Propeller and Helicopter Rotor Blades*; U.S. DOT, Federal Aviation Administration; Mar. 1993; entire document.

* cited by examiner

*Primary Examiner*—William Phillip Fletcher, III
(74) *Attorney, Agent, or Firm*—Jagtiani + Guttag LLLP

(57) ABSTRACT

Low light level illumination is applied to rotary blades of vehicles to increase visibility to minimize ground injuries. Either photoluminescent paint or photoluminescent film may be affixed to rotary blades in use to help deter accidents. An electro-luminescent film may be integrated into future rotary blades to provide greater visibility without making the vehicle vulnerable to detection.

15 Claims, 6 Drawing Sheets

METHOD OF ILLUMINATING A ROTARY BLADE BY APPLICATION OF A PHOTOLUMINESCENT PAINT

This application claims priority from U.S. Provisional Application 60/397,017 entitled "Low Light Level Illumination for Rotating Objects" filed on Jul. 22, 2002. The entire contents of which is hereby incorporated by reference.

BACKGROUND OF THE INVENTION

1. Field of the Invention

The present invention relates generally to a method of illuminating rotating objects to increase visibility to prevent injury, and more particularly to Low Light Level Illumination (LLLI) of rotary blades in aviation and industry to minimize ground accidents.

2. Description of the Prior Art

Previous considerations for rotary blade illumination involve the use of chemiluminescent light sources and electrical light sources. Electric light sources at the end of the blades complicate design when integrating the necessary circuitry that draws power from the aircraft. In addition, these systems produce the undesirable outcome of adding significant weight to the blade tip that must be counter-acted by increasing the section thickness or section modulus near the hub, adding undesirable weight. Chemiluminescent light sources require frequent replacement due to the limited time the chemical reaction provides effective illumination. U.S. Pat. No. 4,916,581, No. 5,416,672, and No. 5,793,164, all to Authier, demonstrate the use of chemiluminescent light sources in aviation.

SUMMARY OF THE INVENTION

It is therefore an object of the present invention to provide low light level illumination for rotary blades that will provide an effective deterrent to ground accidents, or propeller strikes without drawing energy from the vehicle or device.

It is a further object to provide low light level illumination for rotary blades that will be resistant to wear, passively rechargeable and self-renewable.

It is yet another object to provide low light level illumination that, when applied to avionic rotary blades, provides visible light to prevent ground accidents but does not make the aircraft vulnerable to detection.

According to a first broad aspect of the present invention, there is provided a low light level illumination treatment to be applied to the rotary blades.

According to a second broad aspect of the invention, there is provided a photoluminescent paint system having a primer coat, a passively charged luminescent coat and a topcoat sealer.

According to a third broad aspect of the invention, an electro-luminescent film to be incorporated into rotary blades.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, the term "extinction time" refers to the time required for afterglow of a light source to diminish to 0.032 mcd/m$^2$, or about 100 times the limit of human perception.

For the purposes of the present invention, the term "rotary blade" or "rotating blade" refers to a device having a revolving hub with radiating blades for propelling an airplane, helicopter, or for moving a fluid such as air or water.

For the purposes of the present invention, the term "substantially transparent" refers to a property wherein material underneath may be easily recognizable.

For the purpose of the present invention, the term "passively charged" refers to non-radioactive photoluminescent materials that are capable of being charged by exposure to natural or artificial light sources.

DESCRIPTION

Rapidly spinning aircraft propellers and rotors pose a serious safety threat to aircraft ground crew, aircrew, and passengers, particularly during low visibility/low light conditions. Potentially distracted by noisy, high tempo flight operations, ground and flight personnel are inadvertently struck each year with tragic consequences. A potential solution to this long-standing safety problem involves the application of an innovative Low Light Level Illumination (LLLI) photoluminescent material to propeller blades, creating a highly effective visual warning indicator. The LLLI concept combines a revolutionary, long-lasting, ultra-bright, non-radioactive photoluminescent material with the additional option of adding an equally effective retro-reflective material to dramatically improve propeller blade visibility under all lighting conditions. The LLLI application maximizes visibility, material adhesion, durability, wear resistance and ease of installation without compromising propeller aerodynamic performance or aircraft detection.

Figure 6:
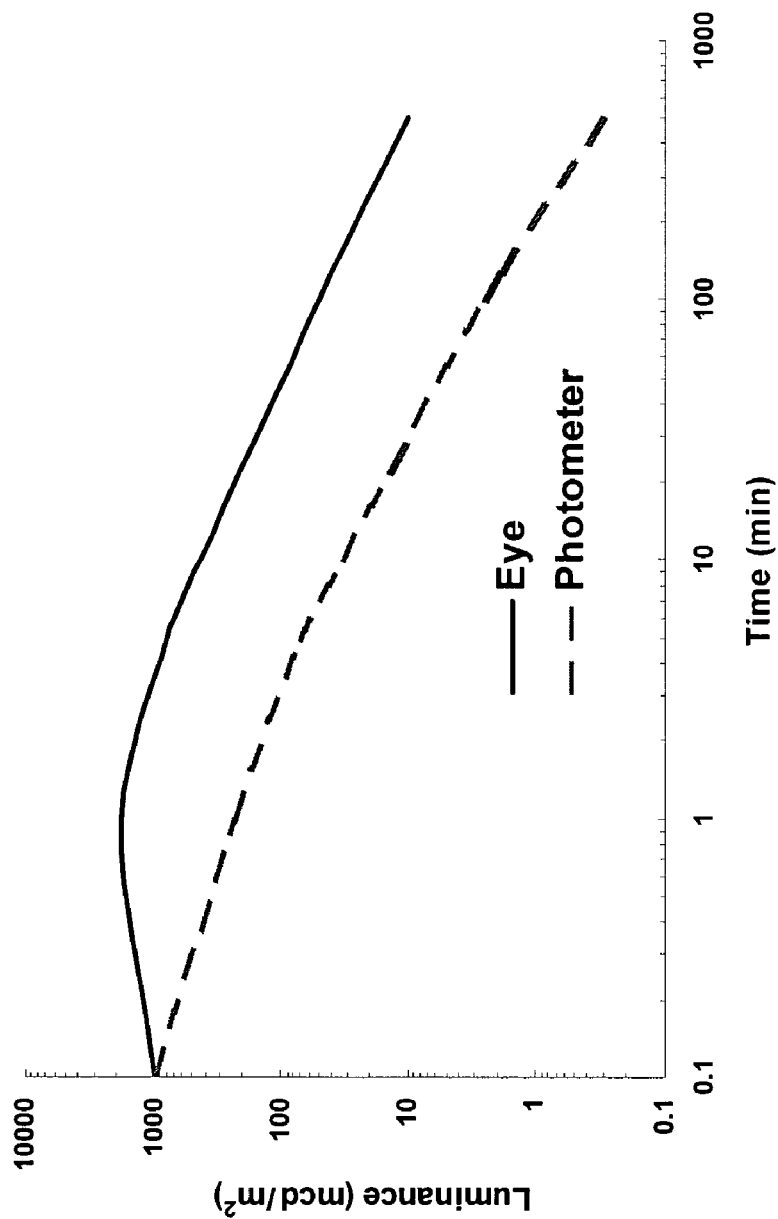
FIG. 6 charts the decrease in brightness for the low light level illumination treatment of the preferred embodiment of the invention over time.

The LLLI material remains visible in all weather and lighting conditions, and in a damaged condition, over the operating period of the aircraft. The human visual system becomes more sensitive when going from light to dark surroundings. This phenomenon is commonly referred to as dark adaptation. This happens because pupils widen to allow more light into the eye. Photochemical changes make the rods and cones in eyes more sensitive. The cones in a retina are approximately 6 times more sensitive after the first few seconds. After 30 minutes, they are 13 times more sensitive. Luminance photometers, which measure the amount of illumination from a light source at a given distance, do not account for dark adaptation. Unlike the human visual system they stay constant in sensitivity. Consequently, luminance photometers underestimate the perceived brightness of a low light source. FIG. 6 shows the decay curve for the LLLI photoluminescent material illustrates the different of "perceived" brightness by the human eye from what a light meter measures.

The basic principle behind photoluminescence is straightforward: electrons orbiting atoms or molecules of the phosphor absorb energy through collision with photons during excitation. The excitation source is electromagnetic radiation—visible and invisible light within a period of time. A photoluminescent material reaches a steady state with the excitation energy source and is considered fully "charged" or "activated." When the excitation source is extinguished, the electrons that were trapped in lower energy excited states slowly return to their original state and release the stored energy in the form of visible light. It is this light, called "afterglow," which is perceived as a glow-in-the dark light source. The intensity of the afterglow is luminance performance and is measured in units of milli-candellas per m² of photoluminescent material. The luminance performance and the time to fully charge are characteristic of the phosphor utilized. For all phosphors, the afterglow decreases over time, exhibiting a hyperbolic decay.

The equation describing the decay is:

$$L_t = L_0 \frac{b^\alpha}{(b+t)^\alpha}$$

Where t is time in seconds; $L_0$ is the initial luminance as measured in milli-candellas per square meter (mcd/m²); $L_t$ is the luminance at time t; and $\alpha$ and b are constants that depend on the chemical composition and physical properties of the photoluminescent material. In assessing the real world utility of a photoluminescent material, one characteristic used to quantify its brightness and longevity is extinction time. It is defined as the time required for the afterglow to diminish to 0.032 mcd/m², or about 100 times the limit of human perception.

The LLLI concept incorporates a powerful, persistent, non-radioactive phosphor composed of rare earth elements. Phosphor density has been optimized for maximum luminous performance per unit of charge. Luminance performance of LLLI photoluminescent material is also determined by the magnitude of the surface illumination of the material by the excitation light source and the duration of light exposure. Surface illumination is a function of the intensity of the light source and the distance between the illuminated photoluminescent material surface and the source. There are an infinite number of activation variations possible. Consequently, it is important to evaluate the LLLI performance that reflects "real life" operational scenarios by testing using a range of light activation conditions. Table 1 below provides the surface illumination for several conditions tested. Surface illumination is measured in units of lux and measurements of the surface illumination were performed using an IM-2D illumination meter.

TABLE 1

Surface Illumination Using Different Light Activation Conditions

| Light Source | Distance between light source and LLLI material | Surface Illumination (Lux) |
|---|---|---|
| Direct Sun | N/A | 25,000 |
| Shade/Cloudy | N/A | 11,500 |
| 500 W Xenon Light | 3 feet | 1000 |
| 65 W Fluorescent Light | 9 feet | 195 |
| 65 W Fluorescent Light | 29 feet | 25 |

Table 2 below provides luminance values of the LLLI material measured after the light source, a 500 W Xenon light with a 5-minute exposure time, was removed. Luminance measurements were conducted using an International Light IL1700 research radiometer with a SED033 visible light detector.

TABLE 2

ASTM E2073 Test Method for Photopic Luminance of Photoluminescent Markings

| Time (Minutes) | LLLI Luminance Results (mcd/m²) |
|---|---|
| 1 | 2,480 |
| 10 | 262 |
| 60 | 35 |
| 120 | 15 |
| 320 | 4.5 |

Obviously, photoluminescent materials perform better with brighter and more prolonged illumination. However, because the light conditions may not always be optimal it is important to determine luminance performance when activated with low light levels as a "worst case" condition. For this test the samples were illuminated with a fluorescent light producing 25 lux at the sample surface for one hour prior to conducting the test. The light source was removed and the luminance results are provided in Table 3 below.

TABLE 3

Luminance of Photoluminescent Film (in mcd/m²) At Specified Time Intervals after "Real World Worst Case Conditions"

| Time (Minutes) | LLLI Luminance Results (mcd/m²) |
|---|---|
| 1 | 358 |
| 10 | 78 |
| 60 | 14 |
| 120 | 4.8 |
| 320 | 1.5 |

To establish a close approximation of actual in-service luminance performance a crude prototype was constructed. Ambient fluorescent light in the space, approximating the intensity routinely found in hangars, and around workspaces, was the source of activation for the LLLI photoluminescent material. It produced moderately low (180-200 lux) illumination at the surface of the markings. Exposure time to "activate the material" was 12 hours. When the light source was turned off, the photoluminescent markings were monitored for the next 5.4 hours representing the maximum operational envelope of a propeller driven aircraft. When rotating, the treated blades created a glowing circle. While the luminance of the markings did decay over time as shown in Table 4 below, they were readily visible after the nearly five and one-half hour test period.

TABLE 4

Luminance of Photoluminescent Film (in mcd/m²)

| Time (Minutes) | LLLI Luminance Results (mcd/m²) |
|---|---|
| 1 | 680 |
| 10 | 154 |
| 60 | 28.3 |
| 120 | 13.5 |
| 320 | 4.5 |

Recall that a luminance value of 0.032 mcd/m² represents 100 times the limit for human perception. It is therefore evident that in low light, as well as high light, activation conditions the photoluminescent markings are readily visible for a typical flight scenario: flight prep, takeoff, landing and ground operations. The luminance performance may be enhanced if either the activation light intensity or the exposure time is maximized. In a preferred embodiment, the photoluminescent material would be readily visible over the entire operational period of the aircraft.

To address concerns that the LLLI treated propeller markings would draw unwanted attention to the aircraft while in-flight, or distract ground-based personnel not working in the near vicinity of the aircraft, a mathematical analysis, the results provided in Table 5 below, consider that photoluminescent light source emission is a function of (1) time and (2) amount of material or area of the markings. The lowest practical visible limit for human perception of the photoluminescent material is established at 0.032 mcd/m². Presumming 13'×4" bands are applied on each side of the four blades, and point source luminance is inversely proportional to distance squared:

$$I_1(d_1)^2 = I_2(d_2)^2$$

TABLE 5

Maximum effective range of visibility of a propeller LLLI system with decreasing luminosity

| Material Luminance (mcd/m²) | Maximum Visible distance (meters) |
|---|---|
| 1000 | 176.78 |
| 500 | 125.0 |
| 100 | 55.9 |
| 50 | 39.53 |
| 20 | 25.0 |
| 10 | 17.68 |
| 5 | 12.5 |

Therefore, although the propeller may be readily seen by personnel working in close proximity to the aircraft, it will not be seen at any appreciable distance from the aircraft. Consequently, even when the LLLI material exhibits the high luminance performance in Table 2, within 10 minutes after the material has ceased charging, an individual would need to be within 75-100 meters of the aircraft to observe the LLLI markings. The risk of aircraft detection in flight or distraction to ground-based personnel during flight operations is negligible.

Environmental exposure testing verifies that the luminance performance of the LLLI photoluminescent material was unaffected by UV, salt spray and humidity/moisture and a range of temperatures from −40° C. to 80° C. Additionally, the luminance performance was not affected by extreme pH, hydrocarbon based products or solvents.

Figure 1:
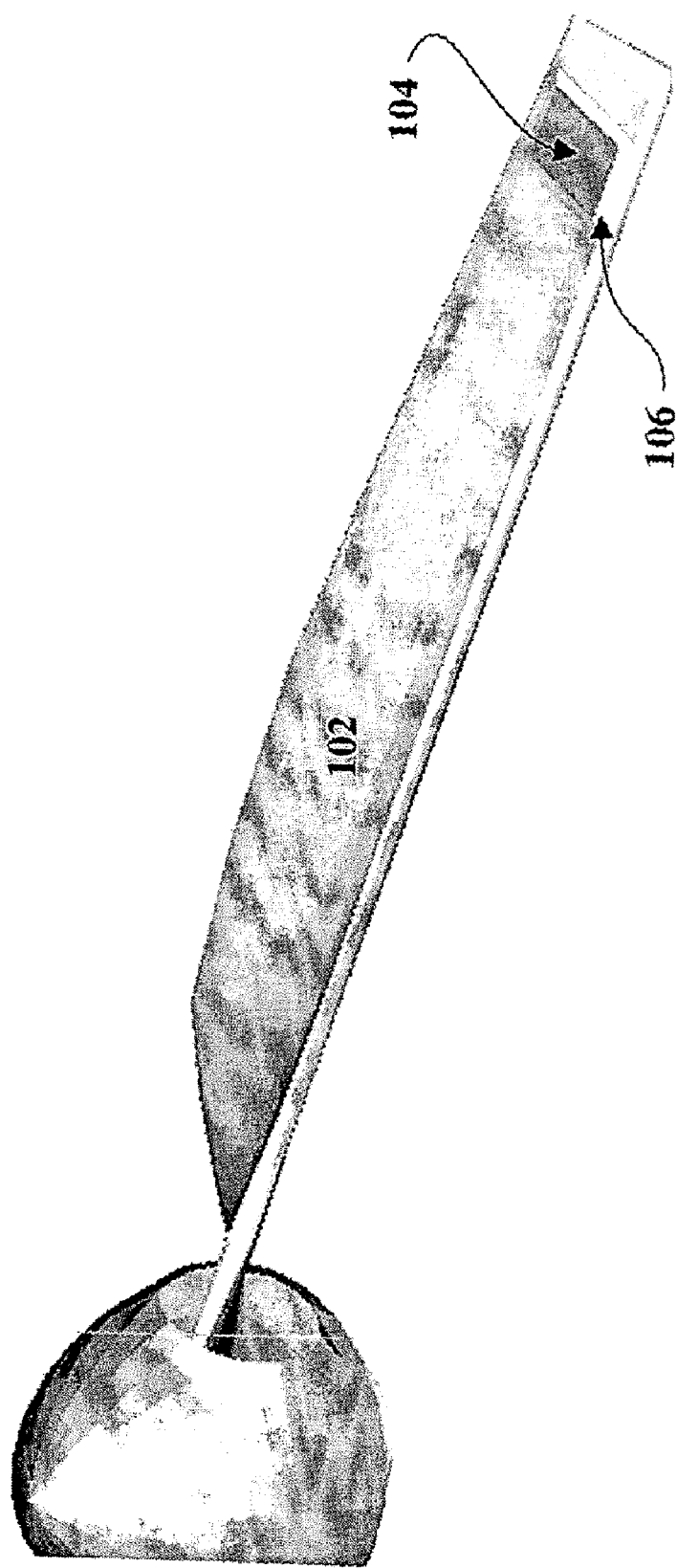
FIG. 1 is a propeller with a low light level illumination treatment constructed in accordance with a preferred embodiment of the invention wherein a film is adhered to the rotating blade.
Figure 2:
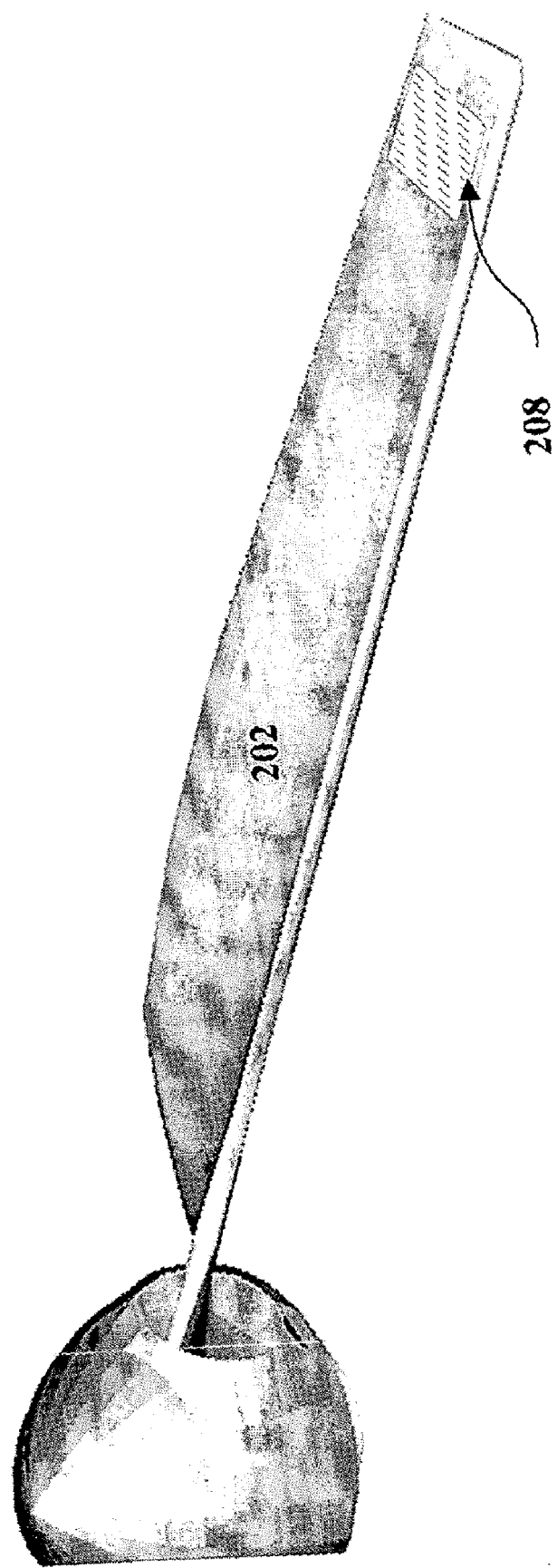
FIG. 2 is a propeller with a low light level illumination treatment constructed in accordance with another preferred embodiment of the invention wherein photoluminescent paint is applied to the rotating blade.
Figure 3:
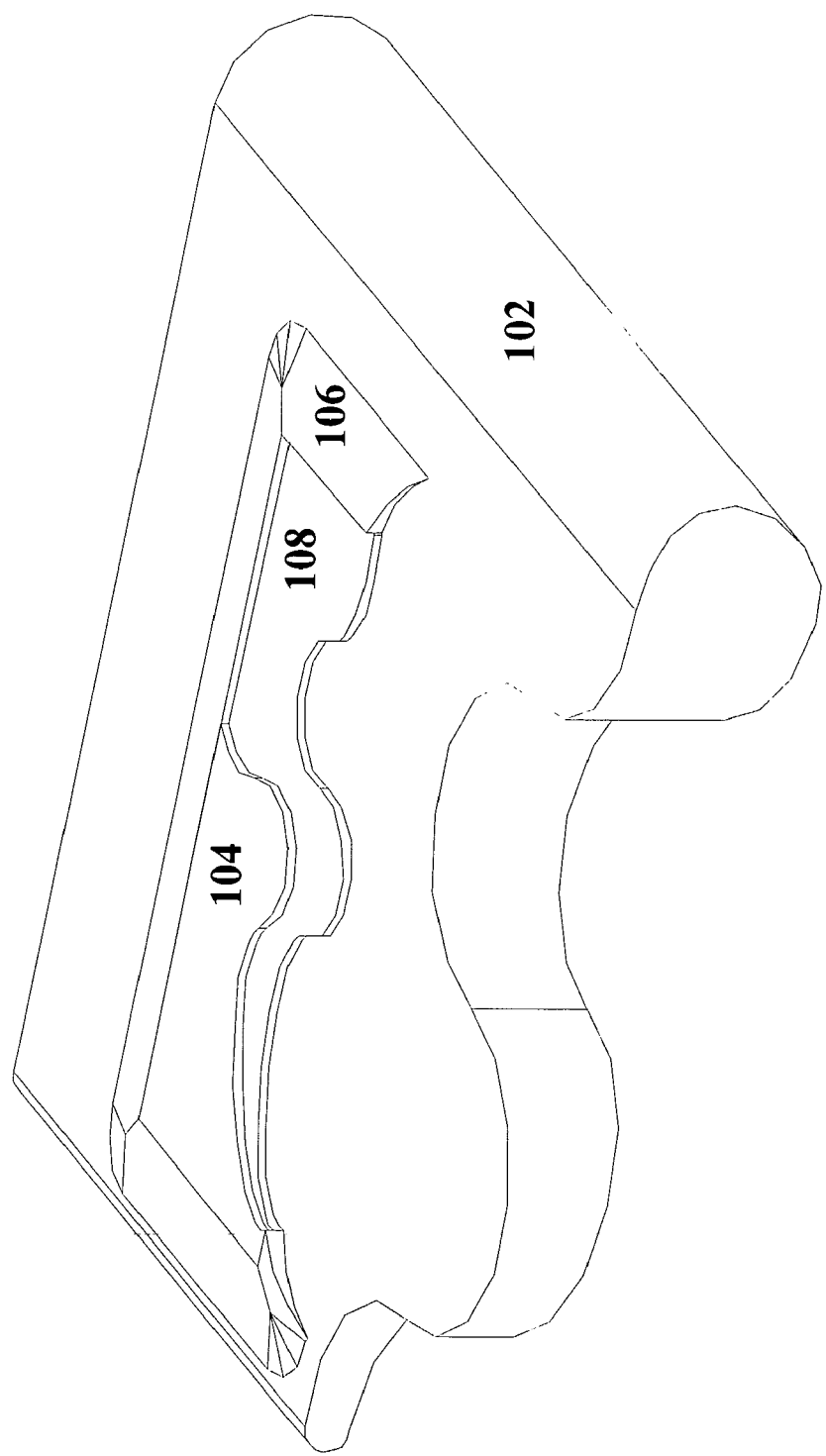
FIG. 3 is a cross-sectional view of the rotating blade of FIG. 1.
Figure 4:
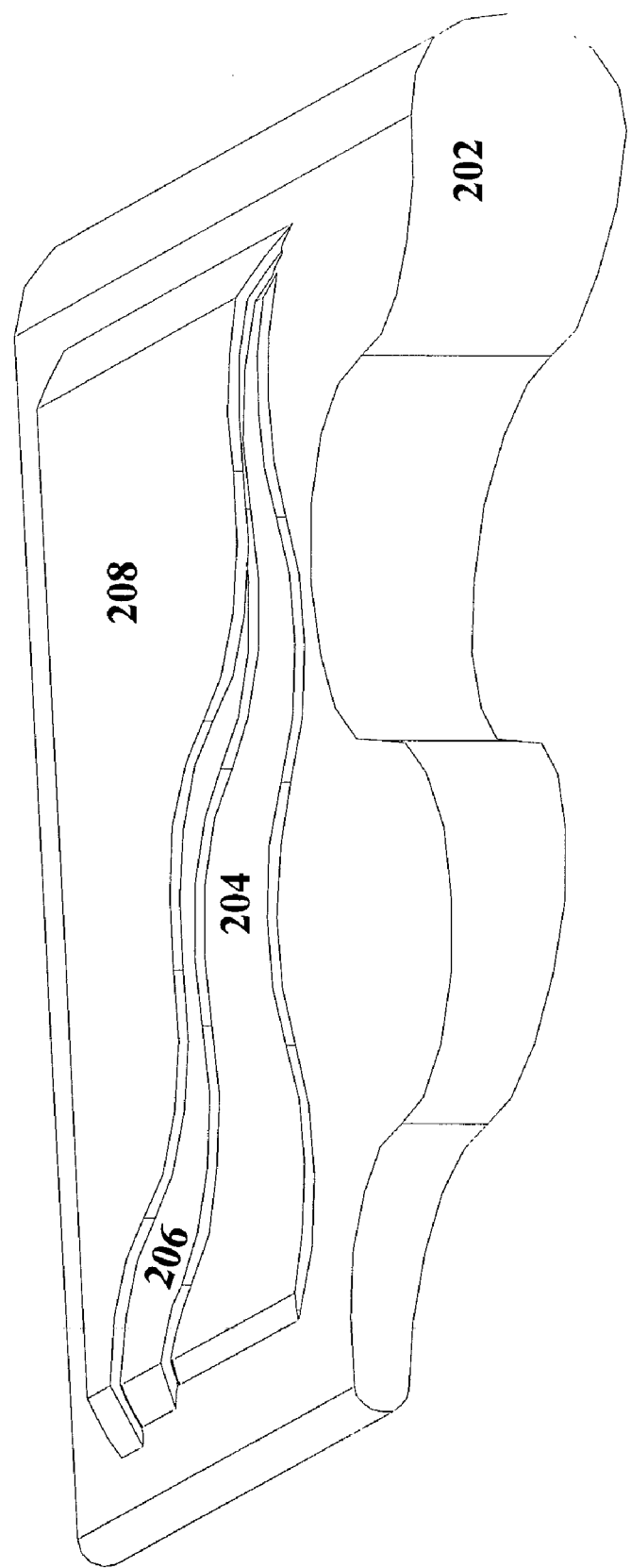
FIG. 4 is a cross-sectional view of the rotating blade of FIG. 2.

There are multiple methods of applying the LLLI photoluminescent and reflective materials. However, design, material and performance characteristics focus on two primary considerations: a photoluminescent paint system, as illustrated in FIGS. 2 and 4, and thin LLLI films secured in place with powerful adhesives, as illustrated in FIGS. 1 and 3. These two systems offer the best opportunity for success while providing the benefits of ease of application, low cost and simplicity.

As shown in FIGS. 2 and 4, the photoluminescent paint system is composed of three parts: a white reflective base primer paint 204; a photoluminescent paint 206; and an optional clear protective topcoat sealer 208, applied to a propeller 202. Each of the three paints are comprised of a two component, high solids, moisture cured polyurethane coating. Component A consists of polyester resins, pigments and solvent. Component B, which acts as the hardener, consists of the clear aliphaticisocynate resin and solvent. Each of the paints are applied to a thickness of 3-6 mils for a total LLLI paint system thickness of 9-18 mils. The paint system is specifically formulated to operate in a rigorous operating environment. They were independently tested to satisfy the following performance characteristics: Flexibility at low temperatures when tested in accordance with ASTM 522 (Method B); Abrasion resistance when tested in accordance with ASTM D 4060-84; Weather resistance when tested in a 6000 watt xenon-arc weatherometer in accordance with ASTM-G26; Humidity resistance when tested in accordance with ASTM D2247-68; Erosion resistance when exposed to an air stream containing sand/dust at a velocity of 100 feet per minute; Adhesion when tested in accordance with FED-STD-141 (Method 6301); Solvent resistance; Resistance to a variety of hydrocarbon-based oils and fuels; Moisture resistant; Salt spray resistance when tested in accordance with ASTM B 117-73. Surface preparation of the substrate to which the LLLI paint system is applied involves creating a 1-2 mil surface profile through the use of a mild abrasive followed by a solvent wipe. Each paint of the LLLI paint system (white reflective primer, photoluminescent paint and top coat sealer) may then be applied with brush, roller or spray methods. The white reflective primer may also act as a topcoat for the photoluminescent paint. Each of the three paints in the LLLI system is manufactured under license by Luna Technologies International under the name "LunaCoat".

The photoluminescent film system is also composed of three parts: a photolumimiscent film 104; an adhesive film 108; and an edge sealer 106. Suitable photoluminescent films include a photoluminescent Nylon resin-based film co-extruded with a white reflective backing and a fluoropolymer film co-extruded with a white reflective backing. Both photoluminescent film materials have been developed specifically for the propeller application, are approximately 12-14 mils thick, and provide superior wear resistance. It should be appreciated that the film may be between 6 mils and 18 mils and still be within the teachings of the present invention. Both photoluminescent films offer the advantages of uniform thickness, repeatability and ease of application. However, the Nylon photoluminescent film provides exceptional erosion resistance but does not achieve flexibility comparable to the PVC materials. The fluororpolymer photoluminescent film is approximately 14-16 mils thick. It should be appreciated that the PVC material may be between 6 mils and 22 mils thick and still be within the teachings of the present invention. Extremely pliable, the fluoropolymer material easily conforms to any geometry when applied. Its elastomeric properties enable it to withstand the dynamic forces and loading associated with the propeller operation. Adhesive films 108 are used to apply the photoluminescent films onto the propeller 102 because of the ease of installation, uniformity and consistent quality. After extensive research, four high performance pressure sensitive thin adhesive films were selected. All are double-sided adhesives and are characterized by the ability to cold flow between the photoluminescent film and the substrate while curing to create a high-strength permanent bond. The four preferred adhesives are: ADCHEM 747: ADCHEM 7325: 3M 9469, and 3M 9500PC. ADCHEM 747 adhesive transfer tape is a 3-5 mil thick high initial tack, soft acrylic permanent pressure sensitive film that adheres to a large variety of substrates and laminates. It exhibits excellent general peel and shear capabilities, values of which are dependent upon the type of substrate and laminate. ADCHEM 7325 adhesive transfer tape is a 2-3 mil thick moderate initial tack hard acrylic permanent pressure sensitive film that exhibits good resistance to a variety of environmental conditions. It also provides excellent general shear and peel properties with a bond whose adhesion builds with time. Specific performance values are also dependent upon the type of substrate and laminate. The 3M F-9469PC adhesive transfer tape is a 2-5 mil transfer tape that performs best on materials with high surface energy. In addition to providing high shear strength, it is also highly resistant to solvents, moisture and ultraviolet radiation, and tolerant to a wide temperature range. In a preferred embodiment, the temperature range for the adhesive material would be −30° C. to 100° C. 3-M 9500 PC is a 3-0.5 mil thick polyester adhesive with high initial tack. In high speed propeller or rotor applications using the LLLI film it may require the additional application of an edge sealer applied to the perimeter of the film. The leading edge of the films has the highest probability of film delamination potentially causing catastrophic failure of the entire film adhesive. Total film loss on a given blade could cause significant imbalance to the high-speed propeller or rotor. The 3M Corporation manufactures the two edge sealers best suited for this environment: 3M Scotch-Weld 2216 B/A and 3M Scotch-Weld 3532 B/A. The Scotch Weld 2216 B/A is a 2-part, epoxy adhesive that provides a flexible impact-resistant overlap bond with high peel and shear strength. Overlap shear strength ranges from 900-1600 psi dependent upon operating temperature, type of film and substrate. This product exhibits exceptional resistance to environmental conditions including humidity and salt spray as well as resistance to a number of industrial solvents, lubricating oils and fuels. The viscous Scotch-Weld 2216 is easy to manipulate and forms a smooth transitional bond to seal the leading edge of the film to the substrate. The Scotch Weld 3532 B/A is a 2-component, polyurethane adhesive that cures quickly at room temperature to form a tough, impact resistant structural bond. The material sets within 15 minutes and when fully cured after 24 hours exhibits very good shear and peel strength as well. Overlap shear strength ranges from 600-1200 psi dependent upon operating temperature, type of film and substrate. Tensile strength is 3000 psi with an elongation of 98%. This edge sealer is suitable for a large range of substrates and laminates. It should be appreciated that the above-identified adhesives and edge sealers are exemplary, and other adhesives and edge sealers are considered within the scope of the invention.

Figure 5:
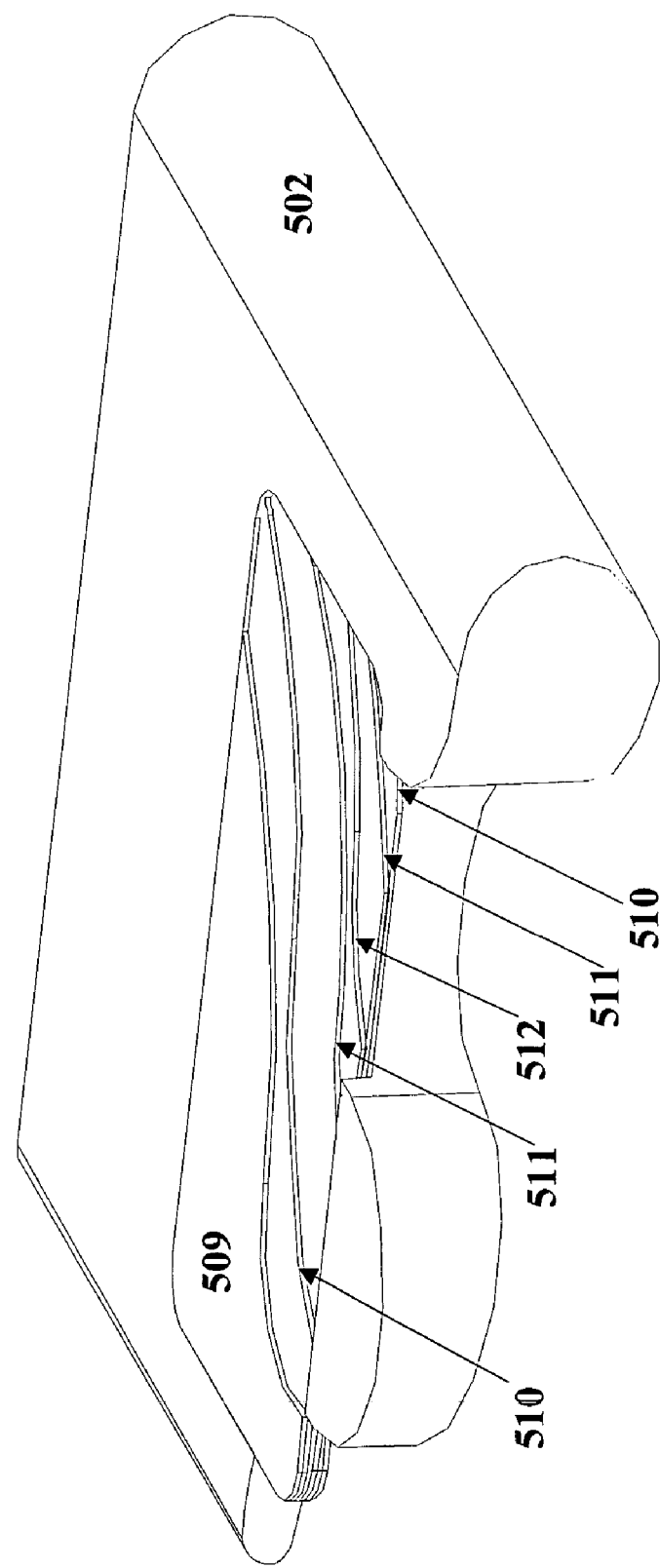
FIG. 5 is a cross-sectional view of an electro-luminescent film incorporated into a rotating blade.

The two methods discussed above are adaptable for currently operating propellers. However, a high field Thin Film Electro-Luminescent (TFEL) film could be incorporated into future fit propellers configured with electric generating capability and features such as electric de-icing. The propeller 502 as shown in FIG. 5 illustrates the TFEL integrated into the propeller. A TFEL device generates light by impact excitation of a light emitting center (called an activator) in a specifically modified phosphor, such as ZnS: Mn by high energy electrons. The high-energy electrons in the phosphor gain their energy from an applied electric field. The TFEL is a layered thin film laminate composed of five layers: a central phosphor layer 512 placed between two insulating layers 511 further sandwiched between two electrodes 510. There is an additional clear, abrasion resistant, UV-tolerant polycarbonate plate 509 applied on top of the TFEL, flush with the blade surface. The central phosphor layer emits light when a large enough electric field (on the order of 1.5 MV/cm) is applied across it. Current limiting layers (the insulators) are needed to form a reliable device structure by preventing a short circuit. The insulators limit the maximum current of the capacitive charging and discharging displacement current level. Finally, the electrodes on the top and bottom of the TFEL film complete a basic capacitive electrical structure. The top electrode, just below the protective plate, is transparent to permit the viewing of the emitted light. Overall thickness of the five-layered TFEL film is 20-80 mils. The film is imbedded into a thin recessed cavity created in the propeller structure. The wires servicing the circuit run through the center of the propeller or, if the propeller is a composite structure, just below the propeller surface. The polycarbonate cover plate, approximately 10-30 mils thick, is placed on top of the TFEL film. The perimeter of the cover plate is bonded into the propeller structure using the same resin structure of the propeller. The transition is faired creating a smooth aerodynamic profile on the propeller. When the circuit is energized, the TFEL film acts as a capacitor that permits a current through the phosphor layer when an applied voltage exceeds a minimum threshold. The threshold can be determined by the choice of insulators and configured based on the available electrical power generating parameters. The thin film phosphor layer also behaves like a capacitor. When the internal phosphor voltage exceeds a threshold, real current flows in the phosphor layer and excites the light emission center. In the ZnS:Mn TFEL phosphor, ZnS is the host lattice doped with Mn atom light emission centers. To be a phosphor host lattice, ZnS satisfies the basic requirements of having a band gap large enough to emit visible light without absorption and to efficiently transport high-energy (>2 eV) electrons. The luminance levels generated by the TFEL film range from 150-400 nits, depending upon the applied voltage and frequency. These light emitting devices generate no heat and have a low power to light ratio. Consequently, they are extremely efficient and reliable. The solid-state nature of electroluminescent technology makes TFEL extremely rugged, a desirable characteristic for a flat panel illumination. Thin and pliable, TFEL can be readily formed to fit the contours of an airfoil profile. Other desirable features of the TFEL film include: lightweight; uniform light output; low power consumption; environmental resistance; economical; variable light output; and damage tolerance. Over 3000 hours of TFEL light operation can be anticipated without replacement of the film making an attractive permanent solution for propellers already configured with electric generating capability. These propellers can be readily modified to utilize excess electric capacity to operate these low power devices. Typical power consumption is 8-10 milli-watts per square meter. And unlike the LLLI film discussed above, the TFEL system offers the advantage of being controlled by the aircraft operator.

All documents, patents, journal articles and other materials cited in the present application are hereby incorporated by reference.

It should be appreciated while present detailed description focuses on aircraft propellers, the teachings of this invention may be utilized on any rotating object where illumination of the object would be desirable. In particular, the teachings of the present invention may be utilized in, but not limited to application of a photoluminescent illumination source for helicopter rotors or industrial applications such as fans, belt drive mechanisms with wheels or spoke pulleys, rotary grinders, pulpers, crushers or mixers, cutting operations such as with circular saw blades or bandsaw blades, or similar equipment that has as a feature a dangerous rotating element.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method of illuminating a rotary blade comprising:
applying a layer of a primer and then a passively charged photoluminescent paint to a rotary blade; wherein the photoluminescent paint when activated is luminous for at least about 5.5 hours.

2. The method of claim 1, wherein said primer is reflective.

3. The method of claim 2, wherein said reflective primer comprises a urethane coating.

4. The method of claim 3, wherein a first component of the urethane coating comprises at least one polyester resin, at least one pigment, and at least one solvent.

5. The method of claim 3, wherein a second component of the urethane coating comprises a resin and at least one solvent.

6. The method of claim 1, farther comprising:
sealing said passively charged photoluminescent paint with a substantially transparent topcoat sealer.

7. A method of illuminating a rotary blade comprising:
applying a layer of a white reflective primer coat and then a passively charged photoluminescent paint to a rotary blade; and
wherein the photoluminescent paint when activated is luminous for at least about 5.5 hours.

8. A method of illuminating a rotary blade comprising:
applying a passively charged photoluminescent paint to a rotary blade; and sealing said passively charged photoluminescent paint with a topcoat sealer.

9. The method of claim 8, wherein said topcoat sealer is substantially transparent.

10. The method of claim 8, wherein said topcoat sealer comprises a urethane coating.

11. The method of claim 10, wherein a first component of said urethane coating comprises at least one polyester resin, and at least one solvent.

12. The method of claim 10, wherein a second component of said urethane coating comprises a resin and at least one solvent.

13. A method of illuminating a rotary blade comprising:
applying a passively charged photoluminescent paint to a rotary blade, wherein said passively charged photoluminescent paint comprises a urethane coating; and
sealing said passively charged photoluminescent paint with a topcoat sealer.

14. The method of claim 13, wherein said urethane coating further comprises at least one resin, at least one pigment, and at least one solvent.

15. The method of claim 14, wherein said at least one resin comprises a polyester resin.

* * * * *